United States Patent [19]

Henry

[11] 4,399,323
[45] Aug. 16, 1983

[54] FAST REAL-TIME PUBLIC KEY CRYPTOGRAPHY

[75] Inventor: Paul S. Henry, Holmdel, N.J.

[73] Assignee: Bell Telephone Laboratories, Incorporated, Murray Hill, N.J.

[21] Appl. No.: 233,034

[22] Filed: Feb. 9, 1981

[51] Int. Cl.³ .......................... H04K 1/02; G09C 1/06
[52] U.S. Cl. ............................... 178/22.14; 178/22.13
[58] Field of Search ........................ 178/22.13, 22.14

[56] References Cited

U.S. PATENT DOCUMENTS

| | | | |
|---|---|---|---|
| 3,958,081 | 5/1976 | Ehrsam et al. | 178/22.05 X |
| 4,218,582 | 8/1980 | Hellman et al. | 178/22 |
| 4,316,055 | 2/1982 | Feistel | 178/22.13 X |

OTHER PUBLICATIONS

Hellman, M. E. "The Mathematics of Public-Key Gryptography" *Scientific American*, vol. 241, No. 2, (Aug. 1979) pp. 146-157.

*Primary Examiner*—Sal Cangialosi
*Assistant Examiner*—K. R. Kaiser
*Attorney, Agent, or Firm*—Gregory C. Ranieri

[57] ABSTRACT

In a public key cryptographic system (FIG. 1) for communicating securely over an insecure communication channel (3), a sender (1, 2) enciphers a data message (D) using a public enciphering knapsack key (H) to generate an enciphered message ($S_H$). An authorized receiver (4, 6, 7, 20, 21, 22) with knowledge of a private deciphering key (E), a modulus (M) and an integer multiplier (W) generates a private enciphering key (A) which is employed in further enciphering the received enciphered message to form a doubly enciphered message ($\hat{S}_E$, $S_E$). The doubly enciphered message is deciphered using the private deciphering key alone to recover the original data message.

8 Claims, 5 Drawing Figures

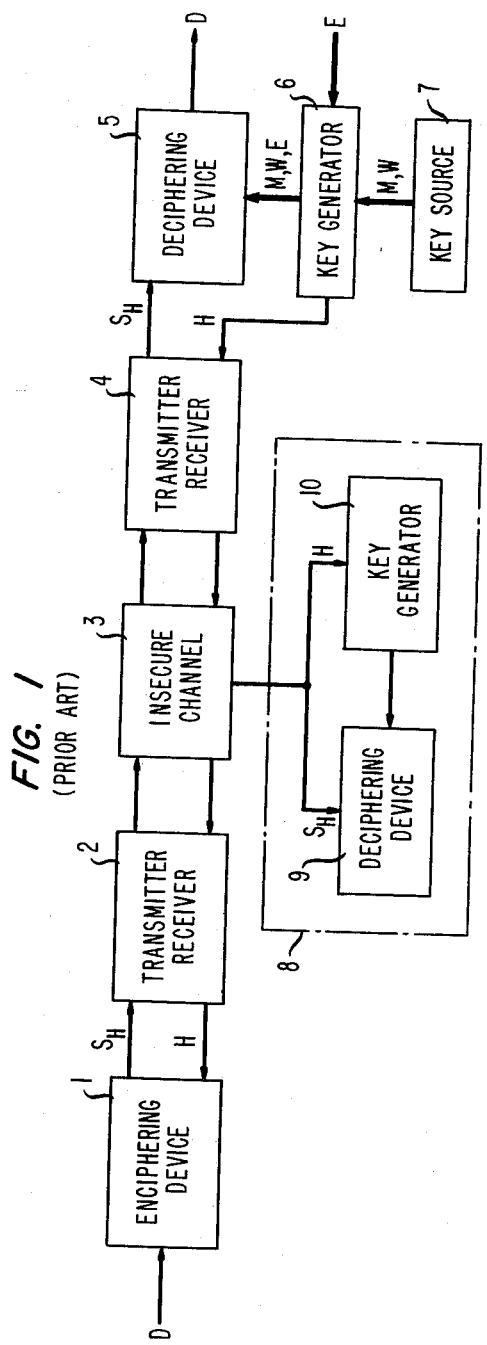
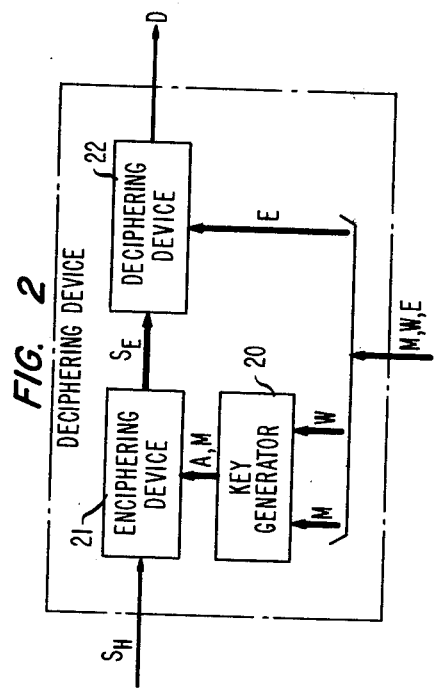
FIG. 1 (PRIOR ART)
FIG. 2

FAST REAL-TIME PUBLIC KEY CRYPTOGRAPHY

TECHNICAL FIELD

This invention relates to the field of cryptography and, more particularly, to public key cryptographic systems.

BACKGROUND OF THE INVENTION

In data transmission networks, it is often necessary to protect stored and transmitted data from compromise or interception by unauthorized parties or eavesdroppers. Cryptography offers the protection necessary for data privacy. However, as the required amount of privacy increases, the transmission rate for encrypted data messages decreases because of an increased complexity of decryption.

One presently popular type of cryptographic system exhibiting this conflict between the competing interests of privacy and data transmission rate is the public key cryptographic system, especially one incorporating a trapdoor knapsack cipher. See U.S. Pat. No. 4,218,582 issued to M. Hellman et al. on Aug. 19, 1980.

Public key cryptographic systems afford authorized users a private means of communication even though unauthorized parties may intercept all of the communication. Heretofore, data transmission rates for these public key cryptographic systems have been constrained to be less than several kilobits per second because of decryption complexity. As such, public key cryptography is attractive only for low rate data and encoded voice transmission.

SUMMARY OF THE INVENTION

Fast real-time operation of a public key cryptographic system incorporating a trapdoor knapsack cipher is achieved, in accordance with an aspect of the invention, by further enciphering a received enciphered message with a private enciphering key. The doubly enciphered message is then deciphered with a private deciphering key into the original message. The private enciphering key is related to two integers which are utilized with the private deciphering key for deriving the public enciphering key.

BRIEF DESCRIPTION OF THE DRAWINGS

A more complete understanding of the invention may be obtained by reading the following description of specific illustrative embodiments of the invention in conjunction with the appended drawings in which:

FIG. 1 is a block diagram of a public key cryptographic system;

FIG. 2 is a block diagram of a deciphering device constructed in accordance with the present invention and useful in the system shown in FIG. 1;

DETAILED DESCRIPTION

Figure 3:
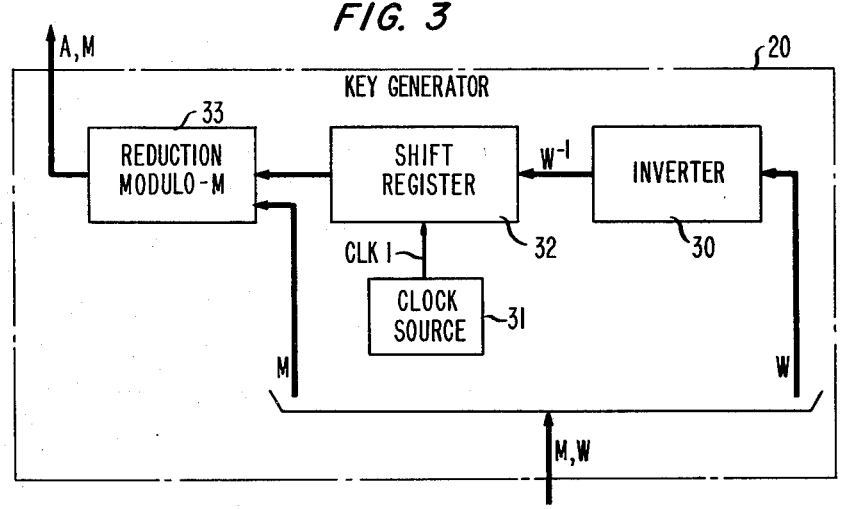
FIG. 3 is a detailed block diagram of key generator 20 shown in FIG. 2.

A public key cryptographic system is shown in FIG. 1. The cryptographic system (hereinafter referred to as "cryptosystem") includes at least two necessary parties communicating in some manner over an insecure channel. The two necessary parties are generically labelled as sender and authorized receiver. A possible third party is generically labelled an unauthorized receiver or eavesdropper. A sender comprising enciphering device 1 and transmitter-receiver 2 utilizes public enciphering key H to encrypt n-bit data message D into k-bit message $S_H$, where $k > n$. Enciphered message $S_H$ is then transmitted via insecure channel 3. An authorized receiver comprising transmitter-receiver 4, deciphering device 5, key generator 6 and key source 7 deciphers message $S_H$ into original data message D. Additionally, the authorized receiver generates the public enciphering key H from a private deciphering key E and two locally generated integers M and W. A third party to this cryptosystem is eavesdropper 8, an unauthorized receiver which comprises deciphering device 9 and key generator 10. Eavesdropper 8 intercepts all communications between the sender and the authorized receiver. After obtaining both message $S_H$ and public enciphering key H, eavesdropper 8 attempts to compromise the privacy of the communication between the sender and the authorized receiver by trying to determine the contents of data message D.

The role of each party described above and the operation of public key cryptosystems are described in more detail in the Hellman et al. patent cited above and in the following references: W. Diffie et al., "Multiuser Cryptographic Techniques," *AFIPS-Conference Proceedings*, Vol. 45, (June 1976), p. 104; W. Diffie et al., "New Directions in Cryptography," *IEEE Transactions on Information Theory*, Vol. IT-22, No. 6 (November 1976), p. 644; and A. Shamir et al., "On the Security of the Merkle-Hellman Cryptographic Scheme," *IEEE Transactions on Information Theory*, Vol. IT-26, No. 3 (May 1980), p. 339. Reference can be made to the above-mentioned publications for a more complete and theoretical exposition of public key cryptography and the Merkle-Hellman (trapdoor) knapsack cipher.

Although the focus in the following description is on the authorized receiver and, particularly, on a deciphering device shown in FIG. 2 which is a suitable replacement for deciphering device 5, pertinent information concerning the trapdoor knapsack cipher, inter alia, is presented below with reference to FIG. 1 to assist in understanding certain aspects of the invention.

Public key cryptosystems are based on the use of trapdoor knapsack functions. Trapdoor knapsack function α is a publicly known enciphering procedure possessing the following properties:

(i) $\alpha^{-1}(\alpha(D)) = D$, where $\alpha(D)$ and $\alpha^{-1}(D)$ are enciphering and deciphering procedures, respectively, (ii) efficient methods exist for computing both α and $\alpha^{-1}$, and (iii) it is computationally infeasible to discover $\alpha^{-1}$ from a complete knowledge of α.

Computational infeasibility relates to a finite but impossibly large cost of performing a task as measured by the amount of memory utilized or by the length of time necessary to perform the required computations.

In relation to the embodiment shown in FIG. 1, the authorized receiver generates the public enciphering key H (trapdoor knapsack function) and transmits it to the sender. In general, H is a vector of n natural numbers $(h_1, -, h_n)$.

Data message D is enciphered only with H, the public enciphering key. Encryption is accomplished in enciphering device 1 wherein n-bit data message D and public enciphering key H are combined as a scalar product. That is, $S_H$ equals D·H. Enciphered message $S_H$ is then transmitted by transmitter-receiver 2 over insecure channel 3.

Reception of enciphered message $S_H$ occurs at transmitter-receiver 4 of the authorized receiver and at eavesdropper 8. Only the authorized receiver is capable of deciphering message $S_H$ because the authorized receiver is the only one privileged to have information about the construction of H.

Eavesdropper 8, an unauthorized receiver, faces a much more difficult task than the authorized receiver. Eavesdropper 8 only possesses knowledge of the public encryption key H and the encrypted message $S_H$ from the sender. From these two pieces of public information, eavesdropper 8 must find a binary-valued vector D comprising $(d_1,-,d_n)$ such that, $$S_H = \sum_{i=1}^{n} h_i d_i. \tag{1}$$

Decryption of enciphered message $S_H$, a problem known as the knapsack problem, has been determined computationally infeasible for eavesdropper 8 provided the public enciphering key H is properly constructed.

For the authorized receiver, decryption of enciphered message $S_H$ is not computationally infeasible because of a hidden structure embedded in the public key H. This structure is hard to discern by eavesdropper 8 because H appears as an n-tuple of random numbers. However, the structure of public encryption key H does enable an authorized receiver to decipher encrypted messages by a straightforward method employing a trapdoor.

Public encryption key H is structurally based upon a superincreasing sequence. A knapsack cipher E, which is a vector $(e_1,-,e_n)$ of n natural numbers, is a superincreasing sequence if $$e_i > \sum_{j=1}^{i-1} e_j, \text{ for each } i = 1, \ldots, n.$$

That is, each element $e_i$ is greater than the sum of its predecessor elements. Knapsack cipher E cannot be used as a trapdoor knapsack function and distributed publicly because any enciphered message $S_E$, $$S_E = \sum_{i=1}^{n} e_i d_i, \tag{2}$$

is deciphered simply by successive subtractions of the elements in knapsack cipher E from the enciphered message $S_E$. See, for example, R. Merkle et al., "Hiding Information and Signatures in Trapdoor Knapsacks," *IEEE Transactions on Information Theory*, Vol. IT-24, No. 5 (September 1978), p. 524. Since the superincreasing structure of E would enable eavesdropper 8 to decipher encrypted message $S_E$ quite easily, the knapsack cipher E is protected from disclosure by the authorized receiver and is known as a private deciphering key.

To hide the structure of private deciphering key E in public enciphering key H, it has been suggested that an authorized receiver generate a modulus M and a multiplier W via key source 7. These two integers satisfy the following relationships:

$$M > \sum_{i=1}^{n} e_i, \text{ and} \tag{i}$$

$$\gcd(M, W) = 1, \tag{ii}$$

wherein gcd is the greatest common divisor function. Relationship (ii) requires integers M and W to be relatively prime thereby insuring the existence of a multiplicative inverse, $W^{-1}$, for W modulo M or W (mod M). Instead of publishing the private deciphering key E, the authorized receiver publishes the public enciphering key H, which is generated in key generator 6 as follows:

$$h_{i=e_{n-i+l}} \cdot W(\text{mod } M), \text{ for each } i=1,-,n \tag{3}$$

The rationale for utilizing $e_{n-i+l}$ rather than $e_i$ in equation (3) is simply to assist in the recovery of data message D in proper sequential order $d_l,-,d_n$ in real time. Thus, $d_1$ is the first data message bit input to the sender's enciphering device and output from the authorized receiver's deciphering device. Knowledge of modulus M, multiplier W and the private deciphering key E allows the authorized receiver to decipher enciphered message $S_H$ in deciphering device 5 quite easily. Decryption is accomplished by using $W^{-1}$, the trapdoor, in the following manner:

$$S_E = S_H \cdot W^{-1} \text{mod } M. \tag{4}$$

That is, scalar multiplication of the enciphered message $S_H$ by the trapdoor integer $W^{-1}$ and a reduction of the product modulo M transforms k-bit message $S_H$ into a p-bit message $S_E$. As described above, message $S_E$ is simply deciphered into n-bit data message D by successive subtractions of elements from the private deciphering key E.

In general, public key cryptosystems such as the one in FIG. 1 perform a direct multiplication of the trapdoor $W^{-1}$ with enciphered message $S_H$. Since the binary representations of both $W^{-1}$ and $S_H$ are typically several hundred bits long, the ensuing multiplication is quite time consuming. This multiplication is completely avoided in accordance with the present invention as shown in FIGS. 2 through 5 by performing an additional encryption of enciphered message $S_H$ with private enciphering key A. This encryption is performed in real time as each bit of message $S_H$ is received from transmitter-receiver 4. Speed of operation and, therefore, the data transmission rate are limited only by propagation delays, access times, and operating efficiencies of the logic circuits used in implementing the invention.

In FIG. 2, a deciphering device, which is capable of being substituted in place of deciphering device 5, is illustrated to show certain aspects of the invention. The deciphering device shown in FIG. 2 includes key generator 20, enciphering device 21 and deciphering device 22. It is assumed that enciphered message $S_H$ is represented as a binary vector $(S_{H,l},-,s_{H,k})$ wherein $s_{H,l}$ is the least significant bit in the representation. A broad line, such as the one labelled $S_E$, indicates a path for parallel transfer of digital information; a narrow line, such as the one labelled $S_H$, indicates a path for serial transfer of digital information.

In key generator 20, private enciphering key A is generated as a vector $(a_l,-,a_k)$ of k natural numbers according to the following relationship, $$a_i = 2^{i-1} W^{-1} (\text{mod } M), \text{ for each } i = 1, -, k. \tag{5}$$

As each element $a_i$ of the private enciphering key A is generated, it is transfered to enciphering device 21 along with modulus M. The transfer of private enciphering key element $a_i$ occurs synchronously with each bit of message $S_H$. As each bit in message $S_H$ enters the deciphering device shown in FIG. 2, enciphering device 21 further encrypts enciphered message $S_H$ using private enciphering key A as follows:

$$\hat{S}_E = \sum_{i=1}^{k} a_i s_{H,i}, \tag{6}$$

where $s_{H,k}$ is the $k^{th}$ element and most significant bit of the binary representation for enciphered message $S_H$. Doubly encrypted message $\hat{S}_E$ is then reduced modulo-M into message $S_E$ which is transmitted to deciphering device 22.

$$S_E = \hat{S}_E (\text{mod } M). \tag{7}$$

Message $S_E$ contains p bits, where $n \leq p \leq k$.

Deciphering device 22 recovers data message D by performing successive subtractions of the n private enciphering key elements $e_i$ from message $S_E$. Data message D is output serially from deciphering device 22.

FIG. 3 shows key generator 20 in more detail. Key generator 20 includes inverter 30, clock source 31, shift register 32, and reduction modulo-M circuit 33 for generating private enciphering key A as defined in equation (6).

Multiplier W and modulus M are input to key generator 20. Inverter 30 employs Euclid's algorithm to determine trapdoor $W^{-1}$. For a description of Euclid's algorithm see, for example, D. Knuth, "The Art of Computer Programming," Vol. II (Reading, MA: Addison-Wesley, 1969), and E. Berlekamp, "Algebraic Coding Theory," (New York: McGraw-Hill, 1968), p. 15. Trapdoor $W^{-1}$ is then completely loaded into shift register 32.

Shift register 32 is a parallel-input, parallel-output shift register having $p+k-1$ stages. Bits stored in register 32 are shifted one stage to the left to the next higher order stages upon each pulse of signal CLK1 from clock source 31. On a first pulse of signal CLK1, trapdoor $W^{-1}$ is initially stored in the p least significant stages of register 32 and binary zeroes occupy the k-1 most significant stages. The contents of register 32 are then reduced modulo-M in reduction modulo-M circuit 33 to form private enciphering key element $a_1$. For a description of the reduction modulo-M techniques, see Yaohan Chu, "Digital Computer Design and Fundamentals," (New York: McGraw-Hill, 1962), Sections 1–9. Private enciphering key element $a_1$ is output from circuit 33 of key generator 20 to enciphering device 21 along with modulus M.

At each successive pulse of signal CLK1, the contents of shift register 32 are shifted left by one stage to a more significant stage and a zero is placed in the least significant stage. Reduction modulo-M circuit 33 then generates each successive private enciphering key element $a_1$ through $a_k$ as described above. All of the k private enciphering key elements, $a_i$, for each $i=1,-,k$ are generated after a total of k clock pulses of signal CLK1.

Of course, all of the elements of key generator 20 except clock source 31 are capable of being replaced by a counter and a read-only-memory (ROM) containing each individual element of private enciphering key A. The ROM is required to have a storage capacity for k p-bit words. Retrieval of private enciphering key A from the ROM is accomplished with the counter by addressing one location in the ROM at each pulse from signal CLK1, from location 1 ($a_1$) to location k ($a_k$) seriatim. This implementation operates faster than the one shown in FIG. 3 because operating speed is merely a function of memory access time of the ROM. Furthermore, the ROM implementation requires that each key element $a_i$ be determined only once prior to use rather than once for each use as in the embodiment shown in FIG. 3.

Figure 4:
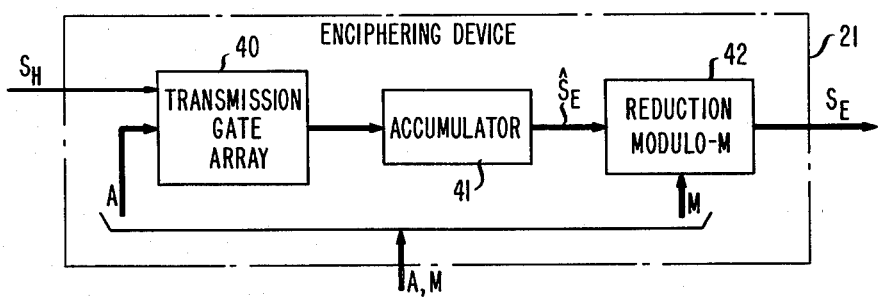
FIG. 4 is a detailed block diagram of enciphering device 21 shown in FIG. 2.

In FIG. 4, enciphering device 21 is shown including transmission gate array 40, accumulator 41 and reduction modulo-M circuit 42. Enciphering device 21 responds to private enciphering key A and modulus M for transforming enciphered message $S_H$ into a different enciphered message $S_E$. Message $S_E$ is actually doubly encrypted because it contains the public enciphering key H employed to generate $S_H$ as well as the private enciphering key A obtained during enciphering in device 21. It is by incorporation of this additional enciphering, i.e., using private enciphering key A, that a public key cryptosystem can increase its operating speed and data transmission rate to at least 10 Mbps.

Transmission gate array 40 is an array of p transmission gates. Array 40 is controlled by the individual bits in message $S_H$ to either transmit or inhibit transmission of each element $a_i$ of private enciphering key A to accumulator 41. For each bit $s_{H,i}$ in message $S_H$ equal to a binary one, the corresponding private enciphering key element $a_i$ is transmitted through array 40. Also, for each bit $s_{H,i}$ in message $S_H$ equal to a binary zero, the corresponding $a_i$ is inhibited from being transmitted through array 40.

The private enciphering key elements $a_i$ which are transmitted through array 40 are added together in accumulator 41. Accumulator 41 has sufficient width to represent a sum having $\delta$ bit positions, where $\delta$ is the smallest integer greater than $p + \log_2 k$. Message $\hat{S}_E$ is output from accumulator 41, in parallel, after all bits $s_{H,i}$ in enciphered message $S_H$ have been received.

At this point, an illustrative example is useful to clarify the operation of array 40 and accumulator 41. Assume that message $S_H$ is a binary valued vector (1, 0, 1, 1, 1) and that private enciphering key A is a vector (176, 61, 122, 244, 82) represented in decimal notation. The following table shows the way in which message $\hat{S}_E$ is generated:

| i | $s_{H,i}$ | $a_i$ | OUTPUT ARRAY 40 | CONTENTS ACCUMULATOR 41 |
|---|---|---|---|---|
| 0 | — | — | — | 0 |
| 1 | 1 | 176 | 176 | 176 |
| 2 | 0 | 61 | 0 | 176 |
| 3 | 1 | 122 | 122 | 298 |
| 4 | 1 | 244 | 244 | 542 |
| 5 | 1 | 82 | 82 | 624 = $S_E$. |

Of course, message $\hat{S}_E$ is represented as a binary vector (0, 0, 0, 1, 1, 1, 0, 0, 1), where the leftmost zero is the least significant bit of $\hat{S}_E$.

After message $\hat{S}_E$ is generated by accumulator 41, it is transferred to reduction modulo-M circuit 42. Circuit 42 accommodates the δ bits in $\hat{S}_E$ and is equivalent structurally to reduction modulo-M circuit 33 described above. In effect, circuit 42 filters message $\hat{S}_E$ to remove all modulus M components from message $\hat{S}_E$. Circuit 42 generates message $S_E$ which is compatible with the modulus (M) of deciphering device 22. Message $S_E$ contains p bits and exhibits the following structure, $$S_E = A \cdot S_H (\text{mod } M), \qquad (8)$$

where · indicates a scalar product of A and $S_H$ and $S_H$ is represented as a binary vector $(s_{H,1}, -, s_{H,k})$.

Figure 5:
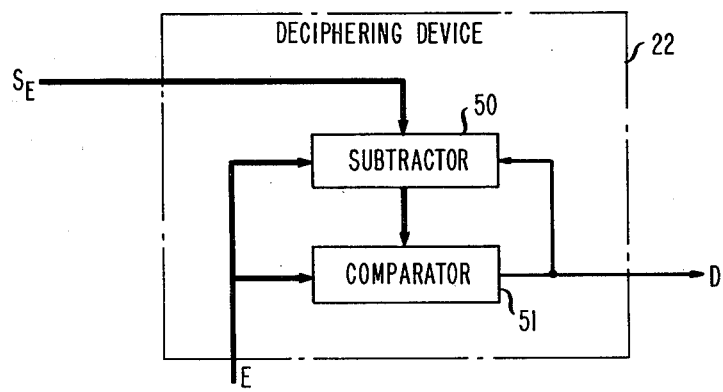
FIG. 5 is a detailed block diagram of deciphering device 22 shown in FIG. 2.

In FIG. 5, deciphering device 22 is shown including subtractor 50 and comparator 51. As described above, deciphering device 22 successively subtracts each private deciphering key element $e_i$ from message $S_E$ to recover data message D. Successive subtraction is initiated with the largest magnitude element $e_n$ of the private deciphering key. Element $e_1$ is the last private deciphering key element to be subtracted.

As the successive subtraction process begins, subtractor 50 contains a binary representation of message $S_E$. Comparator 51 is responsive to message $S_E$ and to private deciphering key element $e_n$. Comparator 51 compares the value of $S_E$ with the value of $e_n$ and decides either that $d_1$ is a binary one, if $S_E$ is greater than or equal to $e_n$, or that $d_1$ is a binary zero, if $S_E$ is less than $e_n$. When $d_1$ is a binary one, subtractor 50 commences a subtraction of $e_n$ from $S_E$. The result from subtraction is then compared with the value of $e_{n-1}$ in comparator 51. Iteration of this process causes generation of data message bits $d_i$ on the basis of each $e_i$ and each successive subtraction result in subtractor 50 until data message bit $d_n$ is finally recovered.

In order to illustrate the aspects of the invention described above, a comprehensive example is set forth below, in which it is assumed that, $$D = (1, 0, 0, 1, 0, 1, 1, 1),$$

$$E = (1, 2, 4, 8, 17, 35, 68, 142),$$

$$M = 291 \text{ and } W = 176.$$

Trapdoor $W^{-1}$ is determined to be 167. Public enciphering key H, as defined in equation (3), is equal to,
$$H = (257, 37, 49, 82, 244, 122, 61, 176).$$

According to equation (5), private enciphering key A exhibits the following form, $$A = (167, 43, 86, 172, 53, 106, 212, 133, 266, 241).$$

Encryption of data message D with public enciphering key H is shown below:

| i | DATA MESSAGE ($d_i$) | PUBLIC KEY ($h_i$) | ELEMENTAL PRODUCTS ($d_i h_i$) |
|---|---|---|---|
| 1 | 1 | 257 | 257 |
| 2 | 0 | 37 | 0 |
| 3 | 0 | 49 | 0 |
| 4 | 1 | 82 | 82 |
| 5 | 0 | 244 | 0 |
| 6 | 1 | 122 | 122 |
| 7 | 1 | 61 | 61 |
| 8 | 1 | 176 | 176 |
|   |   |   | 698 = $S_H$ |

Represented in binary notation, message $S_H$ is transferred to the deciphering device shown in FIG. 2 in the following form, $$S_H = (0, 1, 0, 1, 1, 1, 0, 1, 0, 1).$$

Then, enciphering device 21 determines message $\hat{S}_E$ as,

| i | ENCIPHERED MESSAGE, $s_{H,i}$ | PRIVATE KEY ($a_i$) | ARRAY 40 OUTPUT | ACCUMULATOR 41 CONTENTS |
|---|---|---|---|---|
| 1 | 0 | 167 | 0 | 0 |
| 2 | 1 | 43 | 43 | 43 |
| 3 | 0 | 86 | 0 | 43 |
| 4 | 1 | 172 | 172 | 215 |
| 5 | 1 | 53 | 53 | 268 |
| 6 | 1 | 106 | 106 | 374 |
| 7 | 0 | 212 | 0 | 374 |
| 8 | 1 | 133 | 133 | 507 |
| 9 | 0 | 266 | 0 | 507 |
| 10 | 1 | 241 | 241 | 748 = $S_E$. |

Of course, message $\hat{S}_E$ is reduced modulo-291 by circuit 42 to yield message $S_E$ equal to 166.

Successive subtraction as shown in FIG. 5 as performed as follows,

| i | CONTENTS SUBTRACTOR 50 | PRIVATE KEY ($e_{n-i+1}$) | COMPARATOR 51 OUTPUT, $d_i$ |
|---|---|---|---|
| 1 | 166 | 142 | 1 |
| 2 | 24 | 68 | 0 |
| 3 | 24 | 35 | 0 |
| 4 | 24 | 17 | 1 |
| 5 | 7 | 8 | 0 |
| 6 | 7 | 4 | 1 |
| 7 | 3 | 2 | 1 |
| 8 | 1 | 1 | 1 |
| 9 | 0 | — | — |

Thus, decryption of message $S_H$ into data message D is complete and correct.

The above-described embodiments are merely illustrative of an application of the principle of the invention. Numerous other arrangements may be devised by those skilled in the art without departing from the spirit and scope of the invention. For example, message $S_H$ or data message D may be represented in a radix different from 2. If message $S_H$ is represented as a ternary signal (radix=3), transmission gate array 40 is required to provide inhibition, transmission, or additive inversion of each private enciphering key element $a_i$. Other similar changes obvious to those skilled in the art are necessary to accommodate a different radix from 2. Also, key generator 20 may be implemented in an iterative type of embodiment including a p+1 stage shift register as register 32 containing each output, $a_i$, from reduction modulo-M circuit 33 in the p most significant stages at successive clock pulses of signal CLK1.

What is claimed is:

1. A public key cryptographic system (FIG. 1) for communicating securely over an insecure communication channel (3), the system being of the type including a public enciphering knapsack key (H), a private deciphering key (E), first and second integers (M, W) related to each other and to the private deciphering key according to prescribed criteria wherein the first integer is a modulus M and the second integer is a multiplier W, first enciphering means (1) for transforming a data message (D) with the public enciphering knapsack key into a first enciphered message ($S_H$), means (2) for transmitting the first enciphered message, and receiver means (4-7) for transforming the first enciphered message into the data message (D), the system characterized in that the receiver means includes means (20) responsive to the first and second integers for generating a private enciphering key (A), the private enciphering key is a k-dimensional vector of individual private enciphering key elements ($a_1,-,a_k$) represented as natural numbers, second enciphering means (21) for transforming the first enciphered message ($S_H$) using the private enciphering key into a second enciphered message ($S_E$), deciphering means (22) for transforming the second enciphered message using the private deciphering key into the data message (D), and the private enciphering key generating means includes an inverter means (30) responsive to the second integer for generating a multiplicative inverse $W^{-1}$ therefor, and means (32, 33) responsive to the multiplicative inverse and to the modulus M for generating each individual private enciphering key element according to a prescribed criterion, so that $$a_i = 2^{i-1} W^{-1} (\text{modulo } M),$$

for i = 1, 2, ..., k.

2. The system as defined in claim 1 wherein the first enciphered message is a k-dimensional vector of individual elements represented as binary numbers ($s_{H,1},-,s_{H,k}$) and the second enciphering means includes means (40, 41) responsive to individual elements of the first enciphered message and to individual private enciphering key elements for generating an enciphered message $\hat{S}_E$ in accordance with a prescribed criterion so that $$\hat{S}_E = \sum_{i=1}^{k} a_i s_{H,i},$$

and means (42) responsive to the first integer for filtering the enciphered message to generate the second enciphered message $S_E$.

3. The system as defined in claim 2 wherein the first integer is a modulus M and the filtering means (42) is a reduction modulo-M circuit for generating the second enciphered message $S_E$ according to a prescribed criterion as follows, $S_E = \hat{S}_E(\text{modulo-M})$.

4. The system as defined in claim 3 wherein the generating means of the second enciphering means includes means (40) responsive to each individual element of the first enciphered message for selectively inhibiting transmission of each corresponding private enciphering key element and an accumulator (41) for summing together individual private enciphering key elements transmitted from the selectively inhibiting means to generate the enciphered message $\hat{S}_E$.

5. A receiver adapted for use in a public key cryptographic system (FIG. 1) for transforming a first enciphered message ($S_H$) into a data message (D), the receiver being of the type including a private deciphering key (E), first and second integers (M, W) related to each other and to the private deciphering key according to prescribed criteria wherein the first integer is a modulus M and the second integer is a multiplier W, the receiver characterized by means (20) responsive to the first and second integers for generating a private enciphering key (A), the private enciphering key is a k-dimensional vector of individual private enciphering key elements ($a_1,-,a_k$) represented as natural numbers, second enciphering means (21) for transforming the first enciphered message ($S_H$) using the private enciphering key into a second enciphered message ($S_E$), deciphering means (22) for transforming the second enciphered message using the private deciphering key into the data message (D), and the private enciphering key generating means includes an inverter means (30) responsive to the second integer for generating a multiplicative inverse $W^{-1}$ therefor, and means (32, 33) responsive to the multiplicative inverse and to the modulus M for generating each individual private enciphering key element according to a prescribed criterion, so that $$a_i = 2^{i-1} W^{-1} (\text{modulo } M),$$

for i = 1, 2, -, k.

6. The receiver as defined in claim 5 wherein the first enciphered message is a k-dimensional vector of individual elements represented as binary numbers ($s_{H,1},-,s_{H,k}$) and the second enciphering means includes means (40, 41) responsive to individual elements of the first enciphered message and to individual private enciphering key elements for generating an enciphered message $\hat{S}_E$ in accordance with a prescribed criterion so that $$\hat{S}_E = \sum_{i=1}^{k} a_i s_{H,i},$$

and means (42) responsive to the first integer for filtering the enciphered message to generate the second enciphered message $S_E$.

7. The receiver as defined in claim 6 wherein the first integer is a modulus M and the filtering means (42) is a reduction modulo-M circuit fir generating the second enciphered message $S_E$ according to a prescribed criterion as follows, $S_E = \hat{S}_E(\text{modulo-M})$.

8. The receiver as defined in claim 7 wherein the generating means of the second enciphering means includes means (40) responsive to each individual element of the first enciphered message for selectively inhibiting transmission of each corresponding private enciphering key element and an accumulator (41) for summing together individual private enciphering key elements transmitted from the selectively inhibiting means to generate the enciphered message $\hat{S}_E$.

* * * * *

UNITED STATES PATENT AND TRADEMARK OFFICE
CERTIFICATE OF CORRECTION

PATENT NO. : 4,399,323
DATED : August 16, 1983
INVENTOR(S) : Paul S. Henry

It is certified that error appears in the above—identified patent and that said Letters Patent is hereby corrected as shown below:

Column 4, line 15, equation (3) "en-i+1" should read --$e_{n-i+1}$--. Column 6, line 62, "$S_E$" should read --$\hat{S}_E$--. Column 8, line 21, "$S_E$" should read --$\hat{S}_E$--. Column 9, line 59, claim 4, "$\acute{S}_E$" should read --$\hat{S}_E$--.

Signed and Sealed this

First Day of May 1984

[SEAL]

Attest:

Attesting Officer

GERALD J. MOSSINGHOFF

Commissioner of Patents and Trademarks